(12) United States Patent
Denicola et al.

(10) Patent No.: US 11,738,544 B2
(45) Date of Patent: Aug. 29, 2023

(54) ORIENTED MULTILAYER SHRINK FILMS WITH AMORPHOUS COPOLYESTER SKIN LAYERS

(71) Applicant: TAGHLEEF INDUSTRIES INC., Newark, DE (US)

(72) Inventors: Anthony J. Denicola, Old Lyme, CT (US); Andrew F. Wilkie, Avondale, PA (US)

(73) Assignee: TAGHLEEF INDUSTRIES INC., Newark, DE (US)

( * ) Notice: Subject to any disclaimer, the term of this patent is extended or adjusted under 35 U.S.C. 154(b) by 0 days.

(21) Appl. No.: 17/787,372

(22) PCT Filed: Dec. 18, 2020

(86) PCT No.: PCT/US2020/065872
§ 371 (c)(1),
(2) Date: Jun. 20, 2022

(87) PCT Pub. No.: WO2021/127350
PCT Pub. Date: Jun. 24, 2021

(65) Prior Publication Data
US 2022/0379587 A1 Dec. 1, 2022

Related U.S. Application Data

(60) Provisional application No. 62/951,629, filed on Dec. 20, 2019.

(51) Int. Cl.
*B32B 27/08* (2006.01)
*B32B 7/12* (2006.01)
(Continued)

(52) U.S. Cl.
CPC .............. *B32B 27/08* (2013.01); *B32B 7/12* (2013.01); *B32B 27/302* (2013.01); *B32B 27/32* (2013.01);
(Continued)

(58) Field of Classification Search
CPC ........ B32B 27/32; B32B 27/327; B32B 27/36
See application file for complete search history.

(56) References Cited

U.S. PATENT DOCUMENTS 5,443,765 A 8/1995 Yoshimura et al.
7,147,930 B2 12/2006 Schell et al.
(Continued)

FOREIGN PATENT DOCUMENTS

EP 2233284 A1 9/2010
WO 2017210403 A1 12/2017

OTHER PUBLICATIONS

International Search Report from corresponding PCT/US2020/065872 dated Mar. 15, 2021.

*Primary Examiner* — Zachary M Davis
(74) *Attorney, Agent, or Firm* — Caesar Rivise, PC

(57) ABSTRACT

A multilayer, oriented shrink film includes a core layer, skin layers on opposed sides of the core layer, and an interlayer between each skin layer and the core layer for bonding each skin layer to the core layer. The core layer comprises a polypropylene terpolymer, at least one polybutene-1 copolymer and at least one polypropylene elastomeric copolymer including ethylene. At least one skin layer comprises at least one amorphous glycol-modified polyethylene terephthalate. At least one interlayer includes a polypropylene terpolymer and an ethylene copolymer with vinyl acetate or methyl acrylate. The shrink film has a shrinkage of greater than 50%
(Continued)

Figure 1. Shrink Performance With HS 200 vs HS 310 Skins at 95° C. in one of the machine direction and transverse direction of film formation and has a density below 1.0 g/cm3.

21 Claims, 4 Drawing Sheets

(51) Int. Cl.
  *B32B 27/30* (2006.01)
  *B32B 27/32* (2006.01)
  *B32B 27/36* (2006.01)

(52) U.S. Cl.
  CPC .......... *B32B 27/36* (2013.01); *B32B 2250/24* (2013.01); *B32B 2250/40* (2013.01); *B32B 2270/00* (2013.01); *B32B 2307/414* (2013.01); *B32B 2307/514* (2013.01); *B32B 2307/72* (2013.01); *B32B 2307/732* (2013.01); *B32B 2307/736* (2013.01); *B32B 2553/00* (2013.01)

(56) References Cited

U.S. PATENT DOCUMENTS

| | | |
|---|---|---|
| 9,339,995 B2 | 5/2016 | Zaikov |
| 2010/0279133 A1 | 11/2010 | Kamikage et al. |
| 2016/0136934 A1 | 5/2016 | Mitchell et al. |
| 2017/0174379 A1 | 6/2017 | Mitchell et al. |

ORIENTED MULTILAYER SHRINK FILMS WITH AMORPHOUS COPOLYESTER SKIN LAYERS

CROSS-REFERENCE TO RELATED APPLICATIONS

This application is a U.S. National Phase Application of PCT/US2020/065872 filed Dec. 18, 2020, which claims the benefit under 35 U.S.C. § 119(e) of Application Ser. No. 62/951,629 filed on Dec. 20, 2019, whose entire disclosure is incorporated by reference herein.

BACKGROUND OF THE INVENTION

Field of the Invention

This invention relates generally to shrink films and more particularly to oriented multi-layer shrink films employing an amorphous copolyester in at least one of the skin layers and more specifically a modified polyethylene terephthalate resin in at least one skin layer.

Description of Related Art

Shrink labels represent a significant percentage of labelling applications. Within this category, high shrink labels are the fastest growing segment because of the trend towards contoured containers and shrink sleeve labels with 360° graphics. There are two categories of shrink labels: roll-on-shrink-on (ROSO) labels and sleeve labels. ROSO labels films primarily shrink in the MD direction of film formation and generally employ biaxially oriented polypropylene films with shrink levels of generally less than 20%. Sleeve labels are solvent seamed into a tube and placed around a container. When heat is applied, the label preferentially shrinks in the direction extending circumferentially around the container. Sleeve labels are usually designed to primarily shrink in the TD direction of film formation.

Current high shrink sleeve labels are made from TD shrink films which provide 50% or more shrinkage and are usually made of polyvinyl chloride (PVC), polyethylene terephthalate (PET), glycol-modified polyethylene terephthalate copolyester (PETG), polylactic acid (PLA) or oriented polystyrene (OPS). PVC and PETG are the predominant shrink films in North America. However, there is a push to avoid PVC packaging because of environmental concerns. High shrink labels made from these latter films commonly are applied to PET containers. PETG contaminates the PET in the containers during the recycling process and therefore the labels must be separated from the containers during the recycling process. Since PETG and PET have similar characteristics, there is no elegant way to segregate, or separate them. Recyclers and brand owners are interested in preserving the value of recycled PET from the containers. PETG offers >70% shrinkage at 95° C. and has excellent optics, machinability, and storage capacity. In every way except for floatability and cost, these latter prior art shrink films are considered to be the most desirable shrink films in the U.S. market.

OPS offers low cost and high shrinkage, but optics and rigidity are poor. It also requires climate control for storage and transportation.

COC/PE films are blends of polyethylene (PE) and cyclic-olefin copolymers (COC) in varying ratios and layer structures. Their low density enables them to float on water facilitating separating from the high-density PET bottle scrap. COC/PE films are emerging from a number of suppliers for use in the formation of shrink labels. However, these prior art structures have run into problems ranging from machinability to optics to lack of availability of satisfactory equipment for manufacturing the films. Moreover, the TD oven temperature window to achieve both continuity and acceptable optics is extremely narrow (as little as 1° C.), making commercial viability questionable. COC/PP films have also been introduced in recent years. The Taghleef Industries COC/PP shrink film, which is disclosed in International Publication No. WO2017/210403 has received positive attention in the market and is actively being evaluated in several applications. The cost of COC resin and constraints on availability of that resin places limits on this approach to the market in the short to medium term.

Fuji Seal US 2010/0279133 A1 (EU counterpart Fuji Seal EP 2 2338 284 A1): Discloses a multilayer shrink film including, in order, layer A, which mainly includes a modified aromatic polyester resin; layer B, which is an intermediate layer containing as the main component an ethylene-vinyl acetate resin and layer C, which mainly includes a polypropylene resin.

This prior art shrink film has several deficiencies; including the following:
1) the vinyl acetate content of the B layer must be greater than 20% of the composition or the interlaminar strength is deficient,
2) the core layer C has a substantial amount of hard resin which has a density of ~0.99 g/cm$^3$,
3) the interlayer (layer B) thickness used for a 40 μm film is a relatively thick 3.3 μm, and
4) the skin (layer A) thickness of 6.6 μm is also relatively thick.

These factors combined with a structure layer thickness ratio (A,B,C,B,A) of 2:1:6:1:2 yields a density in excess of 1.0 g/cm$^3$ (~1.05 g/cm$^3$ at a minimum). Therefore, this five (5) layer structure is not floatable, and therefore cannot be reliably separated from PET containers in a recycling operation.

Although the prior art does disclose some shrink films employing PETG skin layers and having a density of less than 1 g/cm$^3$, those films lack other desired attributes, e.g., desired optics, stiffness, ease of fabrication, etc.

Shrink films employing PETG skin layers is disclosed in U.S. Pat. No. 9,339,995, assigned to Avery Dennison. This patent, among other deficiencies, does not disclose any specific, desired composition of a tie layer to enhance performance of the disclosed shrink films. This patent states that the tie layers, in embodiments employing them, may comprise any polymer that improves adhesion of a core layer and a skin layer. There is no recognition of desired tie layer compositions for use in five-layer shrink films to enhance other properties of the shrink film; including shrinkability. Moreover, the '995 patent does not disclose any importance or criticality in employing five-layer shrink films including PETG skins. In fact, the '995 actually discloses three layer shrink films employing PETG skin layers as being within the scope of the disclosed invention.

A shrink label that floats in water allows easy separation from PET containers and preserves the recyclability of the container. It is to such shrink labels and films from which such labels are manufactured that constitute the present invention.

BRIEF SUMMARY OF THE INVENTION

The present invention relates to multilayer oriented shrink films including a core layer, at least one skin layer and at least one interlayer (or tie layer) between the skin and core layers. The core layer comprises one or more propylene polymers as follows:

- One or more members from the group of polymers consisting of polypropylene terpolymers, propylene copolymers, preferably with high content of ethylene, and propylene copolymers, preferably with high content of butene-1. Among the propylene copolymers those with an ethylene content of 4.0-7.0%, by weight of the copolymer, and with a butene-1 content of 7-22% by weight of the copolymer are most preferred.
- At least one Polybutene-1 copolymer,
- At least one polypropylene elastomeric copolymer (with ethylene),
- Optionally at least one copolymer from the group consisting of styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers, styrene-ethylene-co-propylene diblock copolymers and combinations of two or more of said tetrablock, triblock and diblock copolymers, and
- Optionally a hard resin polymer The at least one skin layer comprises at least one amorphous copolyester having a Tg no greater than 85° C., more preferably in the range of 60° C.-85° C. and most preferably in the range of 60° C.-80° C. Preferably the at least one amorphous copolyester is a modified, amorphous polyethylene terephthalate; most preferably a glycol-modified polyethylene terephthalate (PETG). The at least one interlayer between the PETG skin and polyolefin core contains polypropylene terpolymer and an ethylene copolymer with a co-monomer of vinyl acetate, methyl acrylate or possibly ethyl acrylate. Optionally, the ethylene copolymer with vinyl acetate, methyl acrylate or possibly ethyl acrylate can contain reactive functional groups. These films are useful for the manufacture of labels, in particular solvent seamed sleeve labels, which shrink, when heated at temperatures compatible with the use of a steam tunnel, to conform to the shape of the container. Density of the film is below 1.0 g/cm$^3$ and preferably below 0.98 g/cm$^3$.

As noted earlier, in accordance with the broadest aspects of this invention in the core layer, in addition to including at least one polybutene-copolymer and at least one polypropylene elastomeric copolymer with ethylene, also includes one or more members from the group of polymers consisting of polypropylene terpolymers, propylene copolymers, preferably with high content of ethylene, and propylene copolymers, preferably with high content of butene-1. Among the propylene copolymers those with an ethylene content of 4.0-7.0% and with butene-1 content of 7-22% are most preferred.

Most preferably the best shrinkage properties are obtained with the use of polypropylene terpolymer by itself; that is without the use of a high ethylene/propylene random copolymers and high butene-1/propylene random copolymers. With the use of polypropylene terpolymer by itself shrinkage levels over 60% at 95° C. are consistently obtained. Not quite as high shrinkage levels at 95° C. are obtained with the use of a high ethylene/propylene copolymer and/or high butene-1/propylene copolymer replacing all or some of the polypropylene terpolymer in the core layer. However, these lower shrinkage levels, i.e., still over 50% at 95° C., are suitable for many applications. Representative high ethylene/propylene random copolymers and high butene-1/propylene random copolymers usable in the core layer in accordance with the broadest aspects of this invention are:

Ineos Eltex P KS407 is a copolymer of propylene and about 4.0% ethylene, with propylene being the predominant component, by weight, and which has a melt flow rate of 5 dg/min (230° C., 2.16 kg), and a DSC peak melting point of about 134° C. This copolymer is available from Ineos Olefins & Polymers USA headquartered in League City, Tex.

Braskem DS6D82 is a copolymer of propylene and about 4.0% ethylene, with propylene being the predominant component, by weight, and which has a melt flow rate of 7 dg/min (230° C., 2.16 kg), and a DSC peak melting point of about 134° C. This copolymer is available from Braskem America Inc. headquartered in Philadelphia, Pa.

Total 8573 is a copolymer of propylene and ethylene with propylene being the predominant component, by weight, and having a DSC peak melting point of approximately 136° C. This copolymer is available from Total USA headquartered in Houston, Tex.

LyondellBasell Adsyl 7416 XCP is a copolymer of propylene and ethylene with propylene being the predominant component, by weight, and having a DSC peak melting point of approximately 135° C. This copolymer is available from LyondellBasell in Houston, Tex.

LyondellBasell Adsyl 7415 XCP is a copolymer of propylene and ethylene with propylene being the predominant component, by weight, having a melt flow rate of 0.9 dg/min (230° C., 2.16 kg) and having a DSC peak melting point of approximately 133° C.) LyondellBasell Adsyl 3C30F is a copolymer of propylene and butene-1 with the propylene being the predominant component, by weight, of the copolymer and which has a melt flow rate of 5.5 dg/min (230° C., 2.16 kg), and a DSC peak melting point of 137° C. These copolymers are available from LyondellBasell (referred to below as LYB) in Houston, Tex.

Mitsui Chemicals Tafmer XM-7090 is a copolymer of propylene and butene-1 with the propylene being the predominant component, by weight, of the copolymer and which has a melt flow rate of 7.0 dg/min (230° C., 2.16 kg), and a DSC peak melting point of 98° C.

Mitsui Chemicals Tafmer XM-7080 is a copolymer of propylene and butene-1 with the propylene being the predominant component, by weight, of the copolymer and which has a melt flow rate of 7.0 dg/min (230° C., 2.16 kg), and a DSC peak melting point of 83° C.

Mitsui Chemicals Tafmer XM-7070 is a copolymer of propylene and butene-1 with the propylene being the predominant component, by weight, of the copolymer and which has a melt flow rate of 7.0 dg/min (230° C., 2.16 kg), and a DSC peak melting point of 75° C.

These copolymers are available from Mitsui Chemicals America in New York, N.Y.

In accordance with broad aspects of this invention the at least one skin layer includes an amorphous copolyester having a glass transition temperature no greater than 85° C. and more preferably in the range of 60° C.-80° C. Preferably the amorphous copolyester is a modified polyethylene terephthalate (PET) copolyester; most preferably a glycol modified PET known as PETG. For example, the PET in the skin layer can be copolymerized with other diol components in addition to the ethylene glycol in PET to destroy the crystallinity of the PET, e.g., copolymerizing the PET while replacing part of the ethylene glycol with 1,4-cyclohexanedimethanol (CHDM) or 2,2-dialkyl-1,3-propanediol (also known as Neopentyl glycol (NPG)). However, modification of the PET by replacing part of the dicarboxylic acid component is also within the broadest scope of this invention. Employing glycol modified polyethylene terephthalate provides the best shrinkage properties, e.g., over 60% at 95° C., and is the preferred manner of modifying the polyethylene terephthalate to make it amorphous. The present invention will hereinafter be described in connection with PETG in one or both of the skin layers; it being understood that this is the most preferred form of the invention and is not a limitation on the broadest aspects of this invention as described earlier herein.

In the most preferred embodiments of this invention the amorphous modified polyethylene terephthalate resin has a glass transition temperature (Tg) in the range of 60-80° C. and more preferably 70-80° C. to achieve the desired shrink properties in this invention. The Tg can be controlled by the type of the dicarboxylic acid employed in the polyethylene terephthalate or the diol and the ratio of the monomers (i.e. the ratio 2,2-dialkyl-1,3-propanediol to ethylene glycol) employed in the copolymerization process to render the modified polyethylene terephthalate amorphous.

Applicant has found that five layer film structures with a core layer comprising polypropylene terpolymer (with ethylene and butene) in combination with polybutene-1 copolymers (with ethylene) and polypropylene elastomeric copolymers (with ethylene), at least one skin layer comprising at least one amorphous glycol-modified polyethylene terephthalate (PETG) and at least one interlayer between the core layer and the skin layer comprising at least one polypropylene co- or terpolymer in combination with an ethylene copolymer with vinyl acetate or methyl acrylate, which optionally further contains reactive functional groups, exhibits a very attractive balance of properties and processability. The films and/or labels made from these films have high stiffness, low natural shrink together with directional shrink at 95° C. greater than 50%, haze less than 6% with clarity greater than 60%, density less than 0.98 g/cm$^3$ to facilitate easy separation from PET containers during recycling after use, very good interlaminar z axis strength, and a broad orientation processing window.

The invention provides a multilayer, oriented shrink film having a predominant direction of orientation either in the machine direction or transverse direction of film formation, the multilayer, oriented shrink film comprising a core layer, skin layers on opposed sides of the core layer, and an interlayer between each skin layer and the core layer for bonding each skin layer to the core layer, wherein said core layer comprises: at least one polybutene-1 copolymer; at least one polypropylene elastomeric copolymer including ethylene; at least one or more polypropylene co- or terpolymers selected from the group consisting of polypropylene terpolymers with ethylene and butene-1, propylene ethylene copolymers, propylene butene-1 copolymers, and combinations thereof; optionally, at least one polymer selected from the group consisting of styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers and styrene-ethylene-co-propylene diblock copolymers and combinations thereof; and optionally, at least one aliphatic, hydrogenated hydrocarbon resin, wherein said skin layers comprise at least one amorphous copolyester having a Tg no greater than 85° C., further wherein said interlayers include at least one copolymer of ethylene with at least one polar comonomer, and optionally wherein said multilayer, oriented shrink film is corona treated on at least one surface. The invention provides a multilayer, oriented shrink film wherein said propylene ethylene copolymers include propylene high ethylene copolymers having an ethylene content in the range of 4.0%-7% by weight of the copolymer and wherein said propylene butene-1 copolymers include propylene, high butene-1 copolymers having a butene-1 content in the range of about 7 to about 22% by weight of the copolymer. The invention provides a multilayer, oriented shrink film wherein said core layer comprises at least one polybutene-1 copolymer, at least one polypropylene elastomeric copolymer including ethylene and a polypropylene terpolymer, said terpolymer being the primary component, by weight, in the core layer. The invention provides a multilayer, oriented shrink film wherein the terpolymer is the primary component in the core layer. The invention provides a multilayer, oriented shrink film wherein the core layer has a thickness greater than the combined thickness of the opposed skin layers and the two interlayers. The invention provides a multilayer, oriented shrink film wherein said core layer comprises: about 30% to about 40% polypropylene co- or terpolymer selected from the group consisting of polypropylene terpolymers with ethylene and butene-1, propylene ethylene copolymers, propylene butene-1 copolymers and combinations thereof; about 20% to about 27% polybutene-1 copolymer; about 20% to about 33% polypropylene elastomeric copolymer; optionally, about 0% to about 20% polymer selected from the group consisting styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers and styrene-ethylene-co-propylene diblock copolymers and combinations thereof; optionally, about 1% to about 16% aliphatic, hydrogenated hydrocarbon resin. The invention provides a multilayer, oriented shrink film wherein said core layer comprises about 0% to about 20% polymer selected from the group consisting styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers and styrene-ethylene-co-propylene diblock copolymers and combinations thereof. The invention provides a multilayer, oriented shrink film wherein said core layer comprises about 1% to about 16% aliphatic, hydrogenated hydrocarbon resin. The invention provides a multilayer, oriented shrink film wherein said amorphous copolyester in said skin layers is a modified polyethylene terephthalate. The invention provides a multilayer, oriented shrink film wherein said amorphous copolyester in said skin layers is a glycol modified polyethylene terephthalate. The invention provides a multilayer, oriented shrink film wherein said skin layers are of substantially the same thickness and said interlayers are substantially of the same thickness. The invention provides a multilayer, oriented shrink film wherein said skin layer includes 100% amorphous glycol-modified polyethylene terephthalate. The invention provides a multilayer, oriented shrink film wherein said skin layers include at least one amorphous copolyester in the form of a glycol-modified polyethylene terephthalate and both of the interlayers include a polypropylene terpolymer and an ethylene copolymer with vinyl acetate or methyl acrylate or ethyl acrylate. The invention provides a multilayer, oriented shrink film wherein the ethylene copolymer with vinyl acetate or methyl acrylate or ethyl acrylate in the interlayers includes reactive functional groups. The invention provides a multilayer, oriented shrink film wherein said interlayers include a combination of ethylene-vinyl acetate terpolymer and polypropylene terpolymer in a ratio for providing interlayer adhesion to said skin layer and core layer in excess of 350 g/in. The invention provides a multilayer, oriented shrink film wherein the polar comonomer is selected from the group consisting of selected from a group comprising MAH, methyl and butyl acrylate and methacrylate, vinyl acetate and vinyl alcohol combined with a polypropylene terpolymer or copolymer. The invention provides a multilayer, oriented shrink film wherein said interlayers comprise: about 50 to about 70% ethylene copolymer with vinyl acetate or methyl acrylate or ethyl acrylate in the interlayer includes reactive functional groups; and about 30% to about 50% at least one polypropylene co- or terpolymer selected from the group consisting of polypropylene terpolymers with ethylene and butene-1, propylene ethylene copolymers, propylene butene-1 copolymers and combinations thereof. The invention provides a multilayer, oriented shrink film wherein the polar comonomer content is less than about 20%. The invention provides a multilayer, oriented shrink film wherein the polar comonomer content is less than about 18%. The invention provides a multilayer, oriented shrink film wherein the polar comonomer content is less than about 16%. The invention provides a multilayer, oriented shrink film wherein said shrink film has a density below 1.0 g/cm3. The invention provides a multilayer, oriented shrink film wherein the density is below 0.98 g/cm3. The invention provides a multilayer, oriented shrink film wherein the density is below 0.95 g/cm3. The invention provides a multilayer, oriented shrink film wherein said shrink film has shrinkage of greater than 50% at 95° C. in the predominant direction of orientation. The invention provides a multilayer, oriented shrink film wherein said shrink film is uniaxially oriented in the transverse direction of film formation. The invention provides a multilayer, oriented shrink film wherein said shrink film is uniaxially oriented in the machine direction of film formation. The invention provides a multilayer, oriented shrink film wherein said film has a haze less than 6% and a clarity greater than 60%. The invention provides a multilayer, oriented shrink film wherein said film has a haze less than 2%. The invention provides a multilayer, oriented shrink film wherein said film has a haze less than 1%. The invention provides a multilayer, oriented shrink film wherein the interlaminar strength between the skin layers and interlayers and between the interlayers and core layer is greater than 150 g/in. The invention provides a multilayer, oriented shrink film wherein said film has a 24 hour natural shrink no greater than 1% in the direction of maximum orientation in the temperature range of 35-45° C. The invention provides a process of making the multilayer oriented shrink film as disclosed herein.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
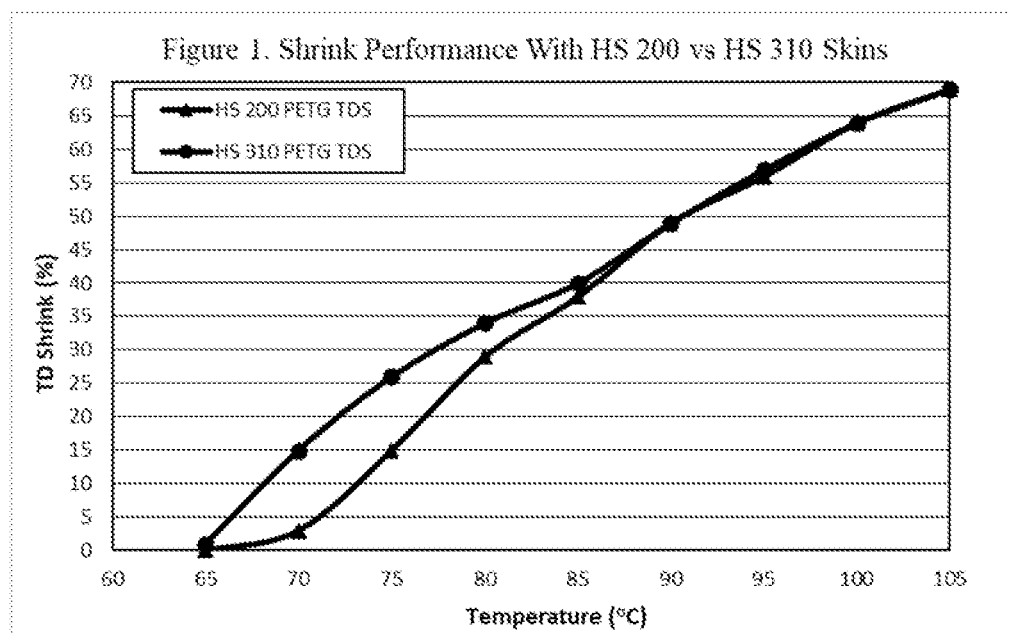
FIG. 1 is a chart showing the TD shrink profiles of the Example 6 and 7 films having different PETG skins.

Exemplary 5-layer structures in accordance with this invention have a density ≤0.98 g/cm$^3$; more preferably ≤0.95 g/cm$^3$. Specifically the preferred structures include glycol-modified polyethylene terephthalate (PETG) skins for solvent seaming, gloss and rigidity as well as printability; a core layer including a combination of polypropylene terpolymer (with ethylene and butene) with polybutene-1 copolymers (with ethylene) and polypropylene elastomeric copolymers (with ethylene), for shrink and clarity, and an intermediate, or interlayer between the core and at least one skin, which in certain embodiments may comprise copolymers of ethylene with at least one polar comonomer selected from a group comprising MAH, methyl and butyl acrylate and methacrylate, vinyl acetate and vinyl alcohol combined with a polypropylene terpolymer or copolymer. Examples of such ethylene copolymers are Arkema Orevac 18211 or Orevac T 9304 or Lotryl 24MA07T. One or both sides of the films can be treated for printing, e.g., oxidatively treated. The overall thickness is in the range of 40-60 μm to match existing, commercial shrink films, but the thickness can be varied within a typical range for bottle label films (e.g., 12 μm to 75 μm).

Representative examples of five layer films in accordance with the most preferred embodiments of this invention are as follows:

| Corona Treatment (optional) | | |
| --- | --- | --- |
| ~2.0-5.5 μm skin layer | 100% | SKC Skygreen S 2008 PETG or Weezen HS200 PETG or Weezen HS310 PETG |
| ~1-4.0 μm interlayer | 70-50% | Arkema Orevac 18211 or Orevac T 9304 or Lotryl 24MA07T |
|  | 50-30% | LYB Adsyl 6C30F or Adsyl 7410 XCP or Adsyl 5C30F Terpolymer |
| ~33-48 μm core layer | 30-40% | LYB Adsyl 6C30F or Adsyl 7410 XCP or Adsyl 5C30F Terpolymer |
|  | 20-27% | LYB Koattro DP8310M or Toppyl DP8220M Polybutene-1 copolymer |
|  | 20-33% | Vistamaxx 3980FL or Versify 3000 elastomeric copolymer |
| ~1-4.0 μm interlayer | 70-50% | Arkema Orevac 18211 or Orevac T 9304 or Lotryl 24MA07T |
|  | 50-30% | LYB Adsyl 6C30F or Adsyl 7410 XCP or Adsyl 5C30F Terpolymer |
| ~2.0-5.5 μm skin layer | 100% | SKC Skygreen S 2008 PETG or Weezen HS200 PETG or Weezen HS310 PETG |

Corona Treatment (Optional)
Polymers
PETG—Glycol-modified Polyethylene Terephthalate (PETG) polymers are available commercially from several companies.

Skygreen S 2008 is a Cyclohexane Dimethanol (CHDM) modified PET with a density of 1.27 g/cm$^3$ and a Tg of 80° C. It is available from SK Chemicals of South Korea or its US distributor ResMart, Fort Worth, Tex. 76140.

Skygreen K 2012 is a Cyclohexane Dimethanol (CHDM) modified PET with a specific gravity of 1.27 g/cm$^3$ and a heat distortion temperature (66 psi) of 74° C. It is also available from SK Chemicals of South Korea or its US distributor ResMart, Fort Worth, Tex. 76140.

Eastar Copolyester 6763 with a density of 1.27 g/cm$^3$ and a Tg of 80° C., available from Eastman Chemical Company of Kingsport, Tenn.

Weezen HS 200, which is a Neopentyl glycol (NPG) modified PET with a density of 1.29 g/cm$^3$, a Tg of 80° C., and an IV of 0.8 dl/g. It is available from Selenis of Portalegre, Portugal.

Weezen HS 310, which is a Neopentyl glycol (NPG) modified PET with a density of 1.31 g/cm$^3$, a Tg of 71° C., and an IV of 0.8 dl/g. It is also available from Selenis of Portalegre, Portugal.

Polypropylene Terpolymer—Polypropylene terpolymers are commercially available from LyondellBasell, Houston, Tex. under the trade name Adsyl and include:

LyondellBasell Adsyl 6C30F is a random terpolymer of propylene, ethylene, and butene. Adsyl 6C30F has a melt flow rate of 5.5 dg/min (230° C., 2.16 kg), and a DSC peak melting point of 126° C.

Suitable alternative random terpolymers include Adsyl 7410XCP, which has a melt flow rate of 5.5 dg/min (230° C., 2.16 kg), and a DSC peak melting point of 125° C., and Adsyl 5C30F with a melt flow rate of 5.5 dg/min (230° C., 2.16 kg), and a DSC peak melting point of 132° C.

In the most preferred embodiments of this invention the terpolymer is a primary component of the core and provides high clarity and is a contributing factor to high shrink performance within the temperature range requirement of heat shrink label applications (90-100° C.). Reference to the terpolymer being the "primary component" means that the percentage by weight of the terpolymer is greater than the percentage, by weight, of any of the other components in the core.

Polybutene-1 Copolymer—Polybutene copolymers are commercially available from LyondellBasell, Houston, Tex. under the trade names Koattro and Toppyl. LyondellBasell Koattro DP8310M and Toppyl DP8220M are Polybutene-1 copolymers with ethylene.

Koattro DP8310M has a melt flow rate of 3.5 dg/min (190° C., 2.16 kg), a melting point of 94° C., and a density of 0.897 g/cc, and is characterized as having a high ethylene content; but less than 50% by weight of the Polybutene copolymer. Toppyl DP8220M has a melt flow rate of 2.5 dg/min (190° C., 2.16 kg), a melting point of 97° C., and a density of 0.901 g/cc and is characterized as having a medium ethylene content. This copolymer has a lower weight percent of ethylene, by weight, than Koattro DP8310M, described above.

The Polybutene-1 copolymer is an important component of the core layer; contributing to the desired, high shrink performance within the temperature range requirement for heat shrink label applications (90-100° C.).

Vistamaxx and Versify Copolymers—Propylene-based polyolefin elastomers (POE's) are commercially available from ExxonMobil Chemical Company under the trade name Vistamaxx or Dow Chemical Company under the trade name Versify.

Composition and structure: These POE's are semi-crystalline copolymers of propylene and ethylene with high propylene levels (>80 wt. %) with isotactic stereochemistry. Crystallinity is modulated by the ethylene content to 5-45% crystallinity complementary to a large amorphous fraction. These POE's also have the following properties: a narrow Molecular Weight Distribution (MWD), a Melt Flow Rate (MFR) in the range of 2 to 25 g/10 min, a density in the range of 0.863 to 0.891 g/cm$^3$, a Glass Transition Temperature Tg in the range of 5 to –31° F. (–15 to –35° C.) and a Melting Range: of 122 to 248° F. (50 to 120° C.) and higher.

Vistamaxx 3980FL: melt index of 3.2 dg/min (190 C, 2.16 kg), or melt flow rate of 8 dg/min (230 C, 2.16 kg) ethylene content of 9%, density of 0.879 g/cc, and Vicat softening point of 76.7° C.

Versify 3000: melt flow rate of 8 dg/min (230 C, 2.16 kg), ethylene content less than 12%, density of 0.89 g/cc, melting point of 108° C., crystallinity=44%, and Vicat softening point of 105° C.

The propylene based POE, like the polybutene-1 copolymer, is an important component of the core layer; contributing to the desired, high shrink performance within the temperature range requirement for heat shrink label applications (90-100° C.).

Ethylene-Vinyl Acetate Polymers—Ethylene based functional copolymers and terpolymers are commercially available from Arkema Inc., King of Prussia, Pa. or its distributor Palmer Holland Inc, North Olmsted, Ohio under the trade names EVATANE, LOTADER, LOTRYL, and OREVAC.

Orevac 18211: Maleic anhydride grafted EVA (ethylene-co-vinyl acetate) polymer with a melt index (190° C., 2.16 kg) of 3.5 g/10 min, melting point of 75° C. and Vicat softening point of 51° C. The vinyl acetate content of the copolymer is 28% and the grafted maleic anhydride content of the copolymer is 0.5%.

Orevac T 9304: Ethylene terpolymer (with vinyl acetate and maleic anhydride) with a melt index (190 C, 2.16 kg) of 7.5 g/10 min, melting point of 80° C., density of 0.95 g/cm$^3$ and Vicat softening point of 49° C. The vinyl acetate content of the terpolymer is 25% and the maleic anhydride content of the terpolymer is 1600 ppm (0.16%)

Ethylene-Methyl Acrylate Polymers—Ethylene based copolymers with methyl acrylate are commercially available from Arkema Inc., King of Prussia, Pa. or its distributor Palmer Holland Inc., North Olmsted, Ohio under the trade name Lotryl.

Lotryl 24MA07T: EMA (Ethylene-co-methyl acrylate) polymer with a melt index (190° C., 2.16 kg) of 7 g/10 min, a melting point of 98° C., and a density of 0.95 g/cm$^3$. The methyl acrylate content of the copolymer is 24%.

Lotryl 24MA02T: EMA (Ethylene-co-methyl acrylate) polymer with a melt index (190° C., 2.16 kg) of 2 g/10 min, melting point of 95° C., density of 0.95 g/cm$^3$, and a Vicat softening point of 40° C. The methyl acrylate content of the copolymer is 24%.

Lotryl 28MA07T: EMA (Ethylene-co-methyl acrylate) polymer with a melt index (190° C., 2.16 kg) of 7 g/10 min, melting point of 65° C., density of 0.95 g/cm$^3$, and a Vicat softening point of <40° C. The methyl acrylate content of the copolymer is 28%.

Lotryl 29MA03T: EMA (Ethylene-co-methyl acrylate) polymer with a melt index (190° C., 2.16 kg) of 3 g/10 min, melting point of 92° C., density of 0.95 g/cm$^3$, and a Vicat softening point of <40° C. The methyl acrylate content of the copolymer is 29%.

Ethylene-Ethyl Acrylate Polymers—Ethylene based copolymer with ethyl acrylate are commercially available from Arkema Inc., King of Prussia, Pa. or its distributor Palmer Holland Inc., North Olmsted, Ohio under the trade name Lotader or DuPont Packaging and Industrial Polymers, Wilmington, Del. under the trade name Elvaloy or Dow Chemical, Midland, Mich. under the trade name Amplify.

Lotader 4700: Ethylene terpolymer (with ethylene acrylate and maleic anhydride) with a melt index (190° C., 2.16 kg) of 7 g/10 min, melting point of 65° C., density of 0.94 g/cm³, and a Vicat softening point of <40° C. The ethyl acrylate content of the terpolymer is 29% and the maleic anhydride content is 1.3%.

Elvaloy AC 2618: EEA (Ethylene-co-ethyl acrylate) polymer with a melt index (190° C., 2.16 kg) of 6 g/10 min, melting point of 95° C., density of 0.93 g/cm³. The ethyl acrylate content of the copolymer is 18%.

Amplify EA 102: EEA (Ethylene-co-ethyl acrylate) polymer with a melt index (190° C., 2.16 kg) of 6 g/10 min, melting point of 98° C., density of 0.93 g/cm³. The ethyl acrylate content of the copolymer is 18.5%.

Processing

Manufacturing of the multilayer oriented shrink film according to this invention can be carried out on a typical tenter frame BOPP line, however, it requires process conditions that are different from those used for making other BOPP label or packaging films. PETG is dried in a desiccant dryer to avoid defects and/or degradation of the resin and the skins are generally thicker than typical BOPP skins.

The cast film is much thinner and sensitive to the exact width of the die lip gap, MD orientation is minimal (less than 1.4× at 80-90° C.), and TD orientation is fairly cold (typically 7× to 8.5× at 90-105° C. without limitation). The essentially uniaxial TD-only oriented film is then wound up on a bobbin.

Manufacturing MD shrink films in accordance with this invention can be carried out in a manner known to those skilled in the art. For example, a multi-layer, relatively thick cast film is co-extruded through a flat film die. The cast film is then quenched or cooled on a chill roll or series of stacked casting rolls. The cooled cast film then is directed into a MD orientation unit where it traverses a series of heated rolls. The reheated cast film is then stretched or oriented up to 10 times or more on smaller diameter rolls rotating at progressively higher speeds. The essentially uniaxially, MD only oriented film is then wound up on a bobbin.

Definitions and Description of the Test Methods

"Percent shrinkage" in referring to the shrinkage of a film or a label formed from such film is calculated in accordance with the following formula:

$$\frac{(\text{Dimension prior to shrinkage} - \text{Dimension after shrinkage})}{\text{Dimension prior to shrinkage}} \times 100$$

"Haze" is reported as a percentage and is determined in accordance with ASTM D1003 test method.

"Clarity" is reported as a percentage and is determined in accordance with ASTM D1746 test method "Density" of the film or label formed therefrom is determined by the displacement procedure of ASTM D792 test method.

"Flexural Stiffness" measures the stiffness or bending resistance of plastic films using an MTS/Sintech Q-Test Model QT-5 or similar instrument, a 2N (~200 g) load cell, a triangular shaped stirrup attached to the load cell and a film holding fixture with a 1 inch wide channel which holds the film in the form of an arc. Film sample length is 4 inches with width between 1 and 4 inches. Crosshead speed is 12 inches/min with maximum compressive force required to bend the film sample at the center of the arc being measured. Results are reported as grams per inch width. (peak grams divided by sample width in inches).

"Gloss" of the film or label formed therefrom is determined in accordance with ASTM 2457 test method.

"Gloss in" refers to the gloss of the inside surface of the produced mill roll and "gloss out" refers to the gloss of the outside surface of the produced mill roll.

"MD" and "TD" refer to the machine direction and the transverse direction in the manufacturing process, respectively.

"MD Gurley stiffness" of the film or label formed therefrom was determined in accordance with ASTM D6125 test method.

"TD and MD shrink tension" of the film or label formed therefrom is determined in accordance with ASTM D2838 test method.

"MD and TD shrink" is determined in hot oil as a function of temperature in accordance with ASTM D1204 test method.

"Natural shrink" of the film is the unconstrained % shrink of a film sample at a prescribed temperature after a defined period of time. As described in the following examples, sample hand sheets, typically 8.5 inches (21.6 cm) by 11 inches (27.9 cm) are cut from the roll in the TD direction. The sample is placed without constraints in a hot air oven set at the prescribed temperature (typically between 35 and 50, i.e. 40° C., and/or 50° C.) for 24 hours. Sample dimensions in the MD and TD direction are measured before and after heat exposure and the percentage shrink is calculated from the change in the measured dimensions.

"Yield" is the coverage in square inches/pound (in.²/lb.) and is determined in accordance with ASTM D4321 test method.

"Z Axis Strength" is the measure of the inter-laminar strength of a film specimen and covers measurement of the forces exerted when a specimen is pulled apart in the Z direction (i.e., through the cross-section). Scotch 610 tape (1 inch width and 8 inches long) is applied to both sides of the film specimen with moderate pressure to ensure that the tape has adhered to the sample on both sides. The two tapes are initially pulled apart manually to initiate inter-laminar failure. Once the z-axis failure has been initiated, the two tape tabs of the sample are placed in a MTS Q-Test/1L tensile tester or similar instrument (25N load cell) and separated at a cross head speed of 35 inches/minute. The peak and peel force is recorded and reported as grams per inch of width. If the sample does not initiate or fail by inter-laminar separation, it is reported as "no delamination".

"Uniaxial" in specifying the direction of orientation of films of this invention refers to films in which the draw ratio in one direction (MD or TD) is less than 1.4× and the draw ratio in the opposed, or orthogonal direction is greater than 2.0×. In such a film the uniaxial direction of orientation is the direction in which the film is stretched more than 2.0×.

"Biaxial" in specifying the direction of orientation of films of this invention refers to films in which the draw ration in both the MD and TD directions is greater than 2.0×.

"Calculated Thickness (µm)=702,538/(yield*density), where yield units are in²/lb. and density units are g/cm³.

"Pin Puncture" measures the puncture resistance of plastic films using an MTS/Sintech Q-Test Model QT-5 or similar instrument, a 250N load cell, a puncture resistance test adapter in the lower jaw and a 1 inch specimen grip in the upper load cell. Crosshead speed is 12 inches/min with the force required to puncture the film sample being measured. Results are reported as grams of force.

Exemplary Five-Layer Structures of Invention

Five layer structures in accordance with this invention are described below.

| Corona Treatment (optional) | |
| --- | --- |
| ~2.0-4.5 μm skin layer | 100% SKC Skygreen S 2008 PETG or Weezen HS200 or Weezen HS310 |
| ~1.0-4.0 μm interlayer | 50-67% Arkema Orevac 18211 or Orevac T 9304 |
| | 33-50% LYB Adsyl 6C30F Terpolymer |
| ~40 μm core layer | 40% LYB Adsyl 6C30F Terpolymer |
| | 26.7% LYB Koattro DP8310M Polybutene-1 copolymer |
| | 33.3% Vistamaxx 3980FL |
| ~1.0-4.0 μm interlayer | 50-67% Arkema Orevac 18211 or Orevac T 9304 |
| | 33-50% LYB Adsyl 6C30F Terpolymer |
| ~2.0-4.5 μm skin layer | 100% SKC Skygreen S 2008 PETG or Weezen HS200 or Weezen HS310 |

Corona Treatment (Optional)

A first formulation or structure was produced with both interlayer formulations consisting of 67 wt. % Orevac 18211 and 33 wt. % Adsyl 6C30F(18.76% vinyl acetate). In the Table below, this film structure is designated Example 1.

A second formulation or structure was produced with both interlayer formulations consisting of 67 wt. % Orevac T 9304 and 33 wt. % Adsyl 6C30F (16.75% vinyl acetate). In the Table below, this film structure is designated Example 2.

The skin composition in both Examples 1 and 2 was SKC Skygreen S 2008 PETG (Cyclohexane Dimethanol (CHDM) modified). TD stretch ratio during film production was 7.3× and MD stretch ratio was 1.2×.

Film samples from both formulations were evaluated and the results reported in Table 1 below.

TABLE 1

| Film Property | Unit of Measure | Example 1 | Example 2 |
| --- | --- | --- | --- |
| Skin Composition | | 100% SKC Skygreen S 2008 PETG (symmetrical skin layers) | |
| Core Composition | | 40% Adsyl 6C30F/26.7% Koattro DP8310M/33.3% Vistamaxx 3980FL | |
| Interlayer Composition | | 67% Orevac 18211/ 33% Adsyl 6C30F | 67% Orevac T 9304/ 33% Adsyl 6C30F |
| TDO Temperatures | ° C. | Preheat/stretch/annealing: 104/104/104 | |
| MDO Temperature | ° C. | 90 | |
| Yield | in$^2$/lb | 13,688 | 14,957 |
| Density | g/cm$^3$ | 0.972 | 0.950 |
| Film Thickness (calculated) | microns | 54 | 50 |
| Skin Thickness (measured) | microns | 4.2 | 4.0 |
| Interlayer Thickness (measured) | microns | 2.3 | 2.7 |
| Haze | % | 0.8 | 0.6 |
| Clarity | % | 66 | 75 |
| 45° Gloss - IN | gu | >100 | >100 |
| 45° Gloss - OUT | gu | >100 | >100 |
| Z axis Strength | g/in | 314 | 361 |
| Flex Stiffness MD/TD | g/in | 2.3/5.9 | 2.0/4.4 |
| Gurley Stiffness MD/TD | | 7.1/15.4 | 7.9/15.2 |
| Pin Puncture | g | 1,952 | 2,054 |

As noted in the above Table 1:

1. The density of both Examples is below 0.98 g/cm$^3$. A density below 1 g/cm$^3$ is an essential feature of this invention; most preferably a density below 0.95 g/cm$^3$ is desired.
2. Both Examples have exceptional haze performance (less than 1%), clarity, surface uniformity, and gloss (>100).
3. The combination of ethylene-vinyl acetate based polymers with polypropylene terpolymer in the interlayers provides excellent inter-laminar strength, i.e., above 150 g/in, between the PETG skins and blended interlayers and between the blended interlayers and the polyolefin core.

The shrink performance and natural shrink as a measure of storage stability of the film structures of Examples 1 and 2 were evaluated and determined to be quite good as shown in Table 2 below. TD shrink values at 95° C. were slightly above 60% and good film dimensional stability at moderate temperatures of 35-45° C. was observed (24 hour natural shrink at or below 1% in the TD direction).

TABLE 2

| Film Property | Unit of Measure | Example 1 | Example 2 |
|---|---|---|---|
| Skin Composition | | 100% SKC Skygreen S 2008 PETG (symmetrical skin layers) | |
| Core Composition | | 40% Adsyl 6C30F/26.7% Koattro DP8310M/33.3% Vistamaxx 3980FL | |
| Interlayer Composition | | 67% Orevac 18211/ 33% Adsyl 6C30F | 67% Orevac T 9304/ 33% Adsyl 6C30F |
| TD Shrink | | | |
| 70° C. | % | 3 | 2 |
| 75° C. | % | 10 | 7 |
| 80° C. | % | 24 | 22 |
| 85° C. | % | 45 | 37 |
| 90° C. | % | 56 | 50 |
| 95° C. | % | 62 | 61 |
| 100° C. | % | 68 | 63 |
| Natural Shrink MD/TD | | | |
| 35° C. | % | 0/0 | 0/0 |
| 40° C. | % | 0/0 | 0/0 |
| 45° C. | % | 0.5/0 | 0/1 |

Example 3 includes the formulation of Example 2, which has a 2:1 weight ratio of Orevac T 9304/Adsyl 6C30F but differs from Example 2 in the overall film thickness and the layer thicknesses of the skins and interlayers, as specified in below Table 3. As can be seen in Table 3, these modifications resulted in a film having a preferred density below 0.95 g/cm$^3$.

TABLE 3

| Film Property | Unit of Measure | Example 3 | |
|---|---|---|---|
| Skin Composition | | 100% SKC Skygreen S 2008 PETG | |
| Core Composition | | 40% Adsyl 6C30F/26.7% Koattro DP8310M/33.3% Vistamaxx 3980FL | |
| Interlayer Composition | | 67% Orevac T 9304/ 33% Adsyl 6C30F | |
| Yield | in$^2$/lb | 18,754 | 19,505 |
| Density | g/cm$^3$ | 0.947 | 0.946 |
| Film Thickness (calculated) | microns | 40 | 38 |
| Skin Thickness (measured) | microns | 3.5 | 3.0 |
| Interlayer Thickness (measured) | microns | 1.3 | 1.4 |
| Haze | % | 0.8 | 0.7 |
| 45° Gloss - IN | gu | 83 | 77 |
| 45° Gloss - OUT | gu | 85 | 80 |
| Z axis Strength | g/in | No Delamination | No Delamination |
| Gurley Stiffness MD | | 3.1 | 3.4 |

As noted in the above Table 3, Example 3 includes two embodiments having, respectively, different film thicknesses; different skin thicknesses and different interlayer thicknesses. Moreover, the thicknesses of the films, skins and interlayers of these two embodiments also differ from the thicknesses of the corresponding layers of Example 2.

Adjustments were made to the above-stated thicknesses for the purpose of achieving a most preferred film density below 0.95 g/cm$^3$ (maintaining skin thickness between 3 and 4 μm). Moreover, the Example 3 embodiments had exceptional haze values (less than 1%). In addition, the combination of ethylene-vinyl acetate terpolymer with polypropylene terpolymer at a 2:1 ratio (16.75% vinyl acetate content in the interlayers) produced an exceptional Z axis strength (no delamination which indicates interlayer adhesion in excess of 350 g/in).

As noted in the below Table 4, Example 3 had acceptable levels of 95° C. shrink performance in the TD direction (>50%) and moderate levels of shrink tension. Low shrink tension is desired, as will be discussed in greater detail hereinafter.

TABLE 4

| Film Property | Unit of Measure | Example 3 | |
|---|---|---|---|
| Skin Composition | | 100% SKC Skygreen S 2008 PETG | |
| Core Composition | | 40% Adsyl 6C30F/26.7% Koattro DP8310M/33.3% Vistamaxx 3980FL | |
| Interlayer Composition | | 67% Orevac T 9304/ 33% Adsyl 6C30F | |
| TD Shrink | | | |
| 70° C. | % | 0 | 3 |
| 75° C. | % | 6 | 12 |
| 80° C. | % | 19 | 28 |
| 85° C. | % | 33 | 43 |
| 90° C. | % | 43 | 54 |
| 95° C. | % | 52 | 61 |
| 100° C. | % | 62 | 68 |
| 105° C. | % | 67 | 72 |
| Shrink Tension TD | | | |
| 80° C. | grams | 182 | 218 |
| 85° C. | grams | 176 | 217 |
| 90° C. | grams | 175 | 243 |
| 95° C. | grams | 194 | 248 |
| 100° C. | grams | 209 | 277 |

Example 4, included the same formulation as Example 2, with the exception of an adjustment to the ethylene-vinyl acetate terpolymer to polypropylene terpolymer ratio in the interlayers (60% Orevac T 9304 and 40% Adsyl 6C30F, with a resulting vinyl acetate content of 15%). The properties of Example 4 are shown in the below Table 5.

TABLE 5

| Film Property | Unit of Measure | Example 4 |
|---|---|---|
| Skin Composition | | 100% SKC Skygreen S 2008 PETG |
| Core Composition | | 40% Adsyl 6C30F/26.7% Koattro DP8310M/33.3% Vistamaxx 3980FL |

TABLE 5-continued

| Film Property | Unit of Measure | Example 4 | |
|---|---|---|---|
| Interlayer Composition | | 60% Orevac T 9304/ 40% Adsyl 6C30F | |
| TDO Temperatures | ° C. | Preheat/stretch/anneal: 98/98/96 | |
| MDO Temperature | ° C. | 80 | |
| Yield | in²/lb | 18,220 | 14,994 |
| Density | g/cm³ | 0.937 | 0.929 |
| Film Thickness (calculated) | microns | 41 | 50 |
| Skin Thickness (measured) | microns | 3.1 | 2.8 |
| Interlayer Thickness (measured) | microns | 3.0 | 2.2 |
| Haze | % | 1.1 | 1.4 |
| 45° Gloss - IN | gu | >100 | 71 |
| 45° Gloss - OUT | gu | >100 | 66 |
| Z axis Strength | g/in | 170 | 196 |
| Flex Stiffness MD/TD | g/in | 1.2/2.5 | 1.7/3.3 |
| Pin Puncture | grams | 1,882 | 1,926 |

In Example 4 above (Table 5), with a reduced ratio of vinyl acetate copolymer in the interlayers as compared to Example 2 (60% Orevac T 9304 and 40% Adsyl 6C30F terpolymer interlayers, 15% vs 16.3% vinyl acetate content) (Table 1), good Z axis strength was maintained and the density target of ≤0.95 g/cm³ was achieved. Exceptional haze (less than 2%) also was observed.

Comparing the results for Example 4 reported in the below Table 6 with the results for Example 2 reported in Table 2 above, it is observed that the TD shrink profile with temperature is not affected by the reduced ratio of vinyl acetate copolymer in Example 4 versus Example 2 and shrink tension values remain moderate in Example 4.

TABLE 6

| Film Property | Unit of Measure | Example 4 |
|---|---|---|
| Skin Composition | | 100% SKC Skygreen S 2008 PETG |
| Core Composition | | 40% Adsyl 6C30F/26.7% Koattro DP8310M/33.3% Vistamaxx 3980FL |
| Interlayer Composition | | 60% Orevac T 9304/ 40% Adsyl 6C30F |
| TDO Temperatures | ° C. | Preheat/stretch/anneal: 98/98/96 |
| MDO Temperature | ° C. | 80 |
| TD Shrink | | |
| 65° C. | % | 0   0 |
| 70° C. | % | 7   8 |
| 75° C. | % | 18  20 |
| 80° C. | % | 27  29 |
| 85° C. | % | 36  40 |
| 90° C. | % | 48  52 |
| 95° C. | % | 58  60 |
| 100° C. | % | 65  66 |
| 105° C. | % | 69  69 |
| Shrink Tension TD | | |
| 80° C. | grams | 283  347 |
| 85° C. | grams | 278  326 |
| 90° C. | grams | 288  338 |
| 95° C. | grams | 306  346 |
| 100° C. | grams | 302  306 |

Example 5 included the same formulation as Example 2, with the exception that the composition ratio of ethylene-vinyl acetate terpolymer to polypropylene terpolymer in the interlayers was reduced to 50/50 (12.5% vinyl acetate content in the interlayers), resulting in the film properties and performance attributes shown in Table 7.

TABLE 7

| Film Property | Unit of Measure | Example 5 | |
|---|---|---|---|
| Skin Composition | | 100% SKC Skygreen S 2008 PETG | |
| Core Composition | | 40% Adsyl 6C30F/26.7% Koattro DP8310M/33.3% Vistamaxx 3980FL | |
| Interlayer Composition | | 50% Orevac T 9304/ 50% Adsyl 6C30F | |
| Yield | in²/lb | 16,270 | 16,110 |
| Density | g/cm³ | 0.937 | 0.939 |
| Film Thickness (calculated) | microns | 46 | 46 |
| Skin Thickness (measured) | microns | 3.5 | 3.5 |
| Interlayer Thickness (measured) | microns | 1.3 | 1.7 |
| Haze | % | 2.5 | 2.4 |
| 45° Gloss - IN | gu | 73 | 78 |
| 45° Gloss - OUT | gu | 72 | 83 |
| Z axis Strength | g/in | 156 | 122 |
| Gurley Stiffness MD | | 3.8 | 4.3 |

It was discovered that the optical properties are essentially insensitive to interlayer composition or thickness, and that the interlayer adhesion as measured by Z axis strength was maintained at an acceptable moderate level of performance (~120-150 g/in) relative to Example 2.

It also was determined that the shrink performance of the Example 5 film, as shown in Table 8, below, had little dependence on the interlayer composition ratio or interlayer thickness within the temperature range evaluated.

TABLE 8

| Film Property | Unit of Measure | Example 5 |
|---|---|---|
| Skin Composition | | 100% SKC Skygreen S 2008 PETG |
| Core Composition | | 40% Adsyl 6C30F/26.7% Koattro DP8310M/33.3% Vistamaxx 3980FL |
| Interlayer Composition | | 50% Orevac T 9304/ 50% Adsyl 6C30F |
| TD Shrink | | |
| 65° C. | % | 0   0 |
| 70° C. | % | 4   4 |
| 75° C. | % | 10  10 |
| 80° C. | % | 24  21 |
| 85° C. | % | 40  36 |
| 90° C. | % | 49  46 |
| 95° C. | % | 58  55 |
| 100° C. | % | 65  64 |
| 105° C. | % | 70  68 |
| Shrink Tension TD | | |
| 80° C. | grams | 261  231 |
| 85° C. | grams | 263  237 |
| 90° C. | grams | 290  242 |
| 95° C. | grams | 347  293 |
| 100° C. | grams | 345  342 |

Upon further dilution of the vinyl acetate level in the interlayer, we finally see an unacceptable level of decline in interlaminar strength values (≤50 g/in). As illustrated in Table 9 below (Comparative Example 1) where the ethylene-vinyl acetate-maleic anhydride terpolymer level in the interlayers is further reduced to 33% and the polypropylene terpolymer level is further increased to 67% (1:2 ratio, 8.25% vinyl acetate content). Z-axis strength shows a very significant (and unacceptable) decline to less than 50 g/in.

TABLE 9

| Film Property | Unit of Measure | Comparative Example 1 | |
|---|---|---|---|
| Skin Composition | | 100% SKC Skygreen S 2008 PETG | |
| Core Composition | | 40% Adsyl 6C30F/26.7% Koattro DP8310M/33.3% Vistamaxx 3980FL | |
| Interlayer Composition | | 33% Orevac T 9304/ 67% Adsyl 6C30F | |
| Yield | in²/lb | 15,647 | 17,178 |
| Density | g/cm³ | 0.943 | 0.934 |
| Film Thickness (calculated) | microns | 48 | 44 |
| Skin Thickness (measured) | microns | 4.2 | 2.7 |
| Interlayer Thickness (measured) | microns | 1.7 | 1.4 |
| Haze | % | 2.5 | 2.4 |
| 45° Gloss - IN | gu | 90 | 85 |
| 45° Gloss - OUT | gu | 94 | 91 |
| TD Shrink | | | |
| 65° C. | % | 0 | 0 |
| 70° C. | % | 4 | 4 |
| 75° C. | % | 10 | 12 |
| 80° C. | % | 26 | 27 |
| 85° C. | % | 43 | 42 |
| 90° C. | % | 55 | 55 |
| 95° C. | % | 63 | 64 |
| 100° C. | % | 68 | 69 |
| 105° C. | % | 72 | 73 |
| Shrink Tension TD | | | |
| 80° C. | grams | 309 | 262 |
| 85° C. | grams | 303 | 293 |
| 90° C. | grams | 350 | 338 |
| 95° C. | grams | 360 | 370 |
| 100° C. | grams | 380 | 360 |
| Z axis Strength | g/in | 45 | 35 |
| Gurley Stiffness MD | | 3.2 | 3.7 |

An alternative PETG resin (neopentyl glycol-modified polyester), Weezen HS 200, supplied by Selenis was evaluated as the skin polymer of a five layer structure which is identified as Example 6 in Table 10, below. The structure had the same core formulation as the previous samples with an interlayer composition consisting of 67% Orevac T 9304 and 33% Adsyl 6C30F. The interlayer thickness was varied between 1.2 μm and 2.3 μm. Slight adjustments were made to the oven zone temperatures for the last sample. As shown in Table 10, Example 6, with a 2:1 ratio of ethylene-vinyl acetate-maleic anhydride terpolymer to polypropylene terpolymer in the interlayers, excellent Z axis strength was obtained with this alternative PETG skin material. Interlayer thickness over the range evaluated did not have a noticeable effect on the properties evaluated.

TABLE 10

| Film Property | Unit of Measure | Example 6 | | |
|---|---|---|---|---|
| Skin Composition | | 100% Weezen HS 200 PETG | | |
| Core Composition | | 40% Adsyl 6C30F/26.7% Koattro DP8310M/33.3% Vistamaxx 3980FL | | |
| Interlayer Composition | | 67% Orevac T 9304/ 33% Adsyl 6C30F | | |
| TDO Temperatures | ° C. | 103/103/100 | 103/103/100 | 100/100/100 |
| Yield | in²/lb | 17,737 | 18,392 | 16,882 |
| Density | g/cm³ | 0.937 | 0.937 | 0.940 |
| Film Thickness (calculated) | microns | 43 | 41 | 44 |
| Skin Thickness (measured) | microns | 3.3 | 3.1 | 3.4 |
| Interlayer Thickness (measured) | microns | 2.3 | 1.4 | 1.2 |
| Haze | % | 3.7 | 2.2 | 1.5 |
| 45° Gloss - IN | gu | 82 | 92 | 93 |
| 45° Gloss - OUT | gu | 81 | 91 | 91 |
| Z axis Strength | g/in | >374 | >300 | >300 |
| Gurley Stiffness MD | | 4.2 | 3.2 | 3.2 |

As illustrated in Table 11 below, shrink performance and shrink tension of Example 6 is comparable to films employing the previously evaluated SKC S 2008 PETG resin in the skin layers.

TABLE 11

| Film Property | Unit of Measure | Example 6 | | |
|---|---|---|---|---|
| Skin Composition | | 100% Weezen HS 200 PETG | | |
| Core Composition | | 40% Adsyl 6C30F/26.7% Koattro DP8310M/33.3% Vistamaxx 3980FL | | |
| Interlayer Composition | | 67% Orevac T 9304/ 33% Adsyl 6C30F | | |
| TDO Temperatures | ° C. | 103/103/100 | 103/103/100 | 100/100/100 |

TABLE 11-continued

| Film Property | Unit of Measure | Example 6 | | |
|---|---|---|---|---|
| TD Shrink | | | | |
| 70° C. | % | 1 | 3 | 1 |
| 75° C. | % | 15 | 15 | 16 |
| 80° C. | % | 32 | 29 | 33 |
| 85° C. | % | 43 | 38 | 46 |
| 90° C. | % | 50 | 49 | 53 |
| 95° C. | % | 59 | 56 | 61 |
| 100° C. | % | 65 | 64 | 67 |
| 105° C. | % | 69 | 69 | 70 |
| Shrink Tension TD | | | | |
| 80° C. | grams | 224 | 215 | 223 |
| 85° C. | grams | 230 | 229 | 224 |
| 90° C. | grams | 257 | 257 | 258 |
| 95° C. | grams | 274 | 240 | 272 |
| 100° C. | grams | 306 | 263 | 289 |

Example 7 was formulated with a second neopentyl glycol-modified PETG from Selenis, HS 310, which has a lower Tg than the HS 200 (71° C. vs 80° C.). In this structure the interlayers were 60% ethylene-vinyl acetate-maleic anhydride terpolymer/40% polypropylene terpolymer. Overall film properties, shown in the following Table 12, are comparable to the Example 6 film produced with the HS 200 skins; having acceptable haze, gloss and Z axis strength.

TABLE 12

| Film Property | Unit of Measure | Example 7 | |
|---|---|---|---|
| Skin Composition | | 100% Weezen HS 310 PETG | |
| Core Composition | | 40% Adsyl 6C30F/26.7% Koattro | |
| | | DP8310M/33.3% Vistamaxx 3980FL | |
| Interlayer | | 60% Orevac T 9304/ | |
| Composition | | 40% Adsyl 6C30F | |
| TDO Temperatures | ° C. | Preheat/stretch/anneal: 101/101/96 | |
| MDO Temperature | ° C. | 80 | |
| Yield | in²/lb | 18,636 | 14,825 |
| Density | g/cm³ | 0.930 | 0.938 |
| Film Thickness (calculated) | microns | 41 | 51 |
| Skin Thickness (measured) | microns | 2.0 | 3.0 |
| Interlayer Thickness (measured) | microns | 2.0 | 3.8 |
| Haze | % | 4.3 | 3.9 |
| 45° Gloss - IN | gu | 85 | 76 |
| 45° Gloss - OUT | gu | 90 | 83 |
| Z axis Strength | g/in | >130 | >200 |
| Gurley Stiffness MD | | 5.9 | 6.6 |
| Flex Stiffness MD/TD | g/in | 2.0/1.6 | 2.0/2.0 |
| Pin Puncture | grams | 1,523 | 1,521 |

As shown in Table 13 below, relating to Example 7, as compared to the properties reported in Table 11 relating to Example 6, the TD shrink initiation temperature of Example 7 is lowered relative to that of Example 6. Moreover, the percent shrinkage of Example 7 is substantially higher than the percent shrinkage of Example 6 (e.g., 70° C. shrink of 15-19% (Example 7) vs 70° C. shrink of 1-3% shrink for the higher Tg PETG grade (Example 6).

TABLE 13

| Film Property | Unit of Measure | Example 7 60% Orevac T 9304/ 40% Adsyl 6C30F Interlayer | |
|---|---|---|---|
| Skin Composition | | 100% Weezen HS 310 PETG | |
| Core Composition | | 40% Adsyl 6C30F/26.7% Koattro | |
| | | DP8310M/33.3% Vistamaxx 3980FL | |
| Interlayer | | 60% Orevac T 9304/ | |
| Composition | | 40% Adsyl 6C30F | |
| TDO Temperatures | ° C. | Preheat/stretch/anneal: 101/101/96 | |
| MDO Temperature | ° C. | 80 | |
| TD Shrink | | | |
| 65° C. | % | 1 | 2 |
| 70° C. | % | 15 | 19 |
| 75° C. | % | 26 | 27 |
| 80° C. | % | 34 | 34 |
| 85° C. | % | 40 | 42 |
| 90° C. | % | 49 | 50 |
| 95° C. | % | 57 | 59 |
| 100° C. | % | 64 | 66 |
| 105° C. | % | 69 | 68 |
| Shrink Tension TD | | | |
| 80° C. | grams | 236 | 235 |
| 85° C. | grams | 237 | 231 |
| 90° C. | grams | 235 | 216 |
| 95° C. | grams | 239 | 242 |
| 100° C. | grams | 273 | 224 |
| Natural Shrink MD/TD | | | |
| 35° C. | % | 0/0 | 0/0 |
| 40° C. | % | 0/0 | 0/0 |
| 45° C. | % | 0/2 | 0/1.5 |

The TD shrink profiles of the Example 6 and 7 films having different PETG skins is further illustrated in the graph of FIG. 1. This shows that Example 6 began shrinking at 70° C., whereas Example 7 began shrinking at 65° C., and also shows that Example 6 had a lower shrink rate than Example 7 at a temperature at or below about 85° C., but that both Examples achieved the same overall shrink at the target shrink tunnel temperature of 95° C.

Figure 2:
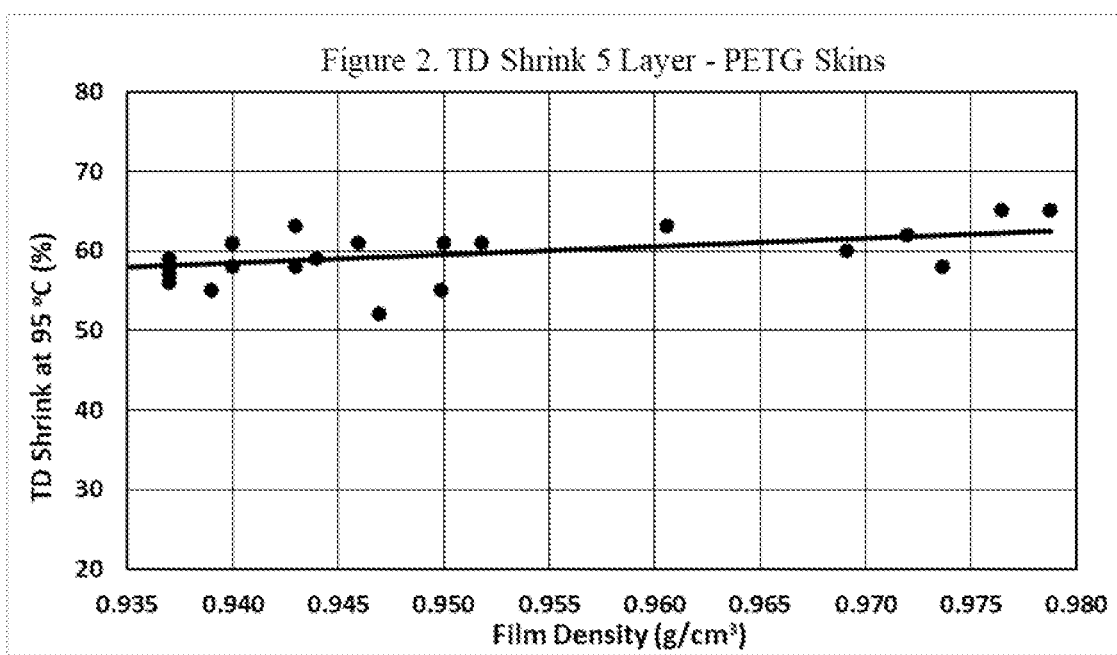
FIG. 2 is a chart showing TD shrink at 95° C. and film density.

A series of films with different PETG skin thicknesses were produced with the formulations of Examples 1-7. The TD shrink at 95° C. and the film density for each of these films was determined. Surprisingly it was determined that a virtual independence existed between skin thickness/density and percent shrink in five layer structures of this invention, as shown in the graph of FIG. 2. Specifically, independent of skin thickness, interlayer thickness, or interlayer composition, the various samples had approximately at 60% shrink at 95° C.

Figure 3:
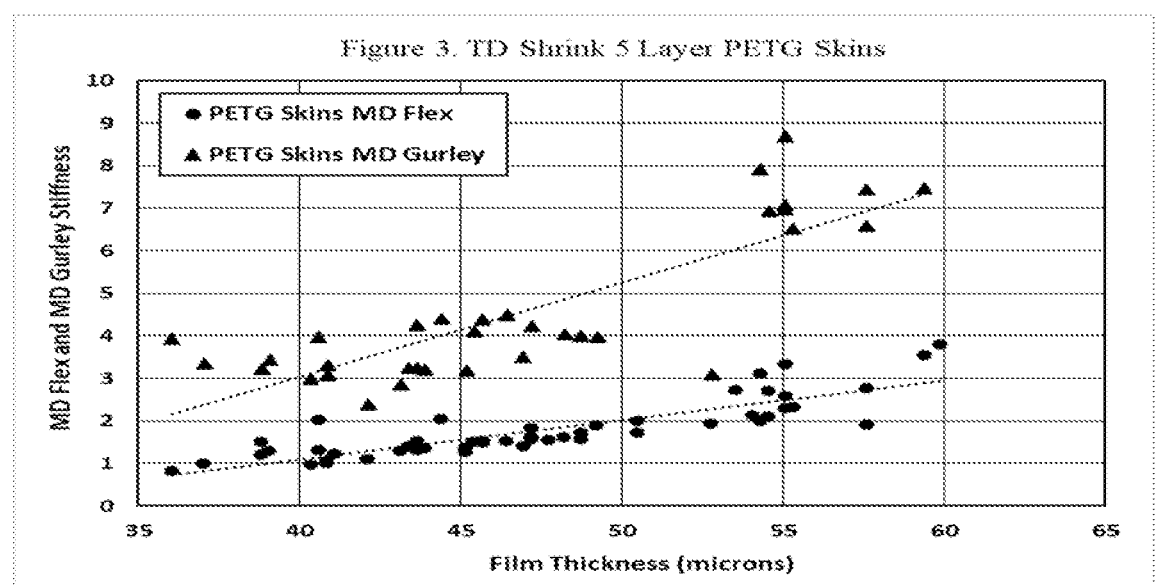
FIG. 3 is a chart showing MD stiffness films as a function of film thickness.

When we examine the MD stiffness of these same films as a function of film thickness, as illustrated in the graph in FIG. 3, we observe a predictable correlation for both Flex Stiffness and Gurley Stiffness with film thickness. That is, the greater the film thickness the less flexible and stiffer the film becomes.

Figure 4:
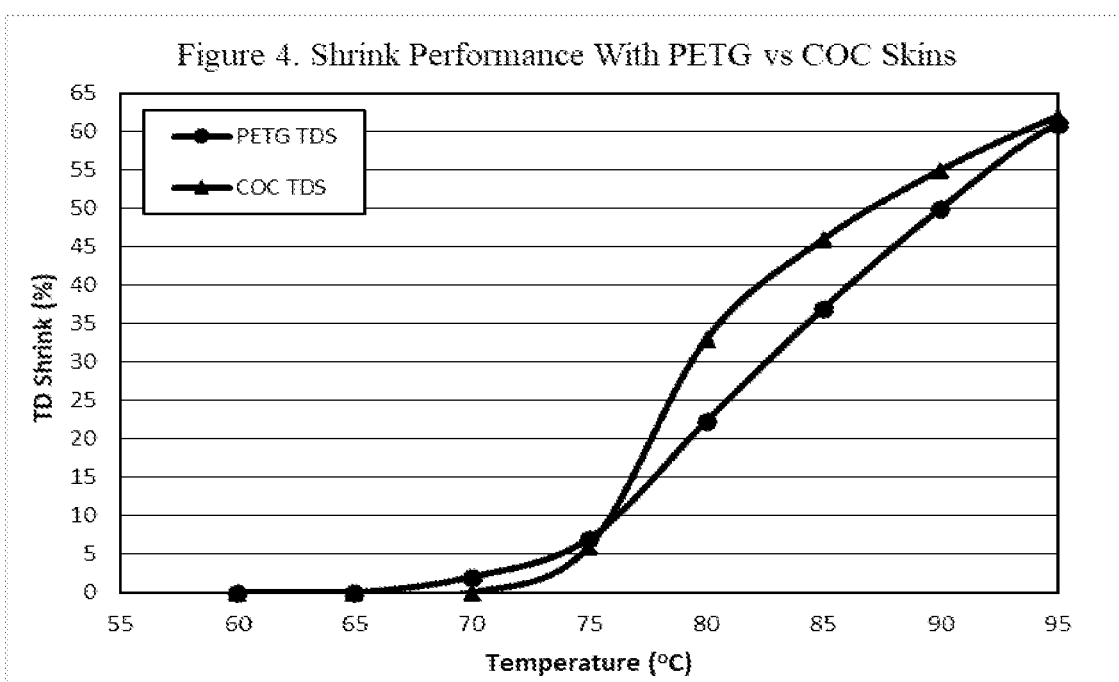
FIG. 4 is a chart showing shrink performance with PETG vs. COC skins.

Another unexpected distinction observed between the five layer shrink films of this invention, which include PETG skin layers, and three layer shrink films including COC skin layers, is reduced shrink tension of the five-layer films of this invention within the relevant shrink temperature range for the five-layer structures. Reduced shrink tension with the required high shrink percentages is a desirable performance feature that has not been achieved in prior art, commercially available PETG shrink films. The undesirably high shrink tensions of such prior art shrink films, when formed into wrap-around, shrink labels, have been known to crush thin-walled bottles. The shrink tension comparison between a 5-layer film within the scope of this invention, employing PETG skin layers, and a three layer shrink film employing COC as the predominant component in the skin layers is shown in Table 14 below:

where wrinkling, creasing, or air entrapment can occur if the sleeves shrink too quickly with temperature as the bottle runs through the shrink tunnel. This is a known problem in some applications with standard, prior art PETG shrink films as well. The comparison of ramp up of shrinkage vs temperature between the prior art COC floatable shrink film and a five layer PETG film of this invention is illustrated in FIG. 4.

Example 9: An additional floatable PETG five layer structure (Example 8) was evaluated, which contains an interlayer composition based on ethylene-methyl acrylate copolymer (Lotryl 24MA07T) in combination with polypropylene terpolymer (Adsyl 6C30F). This five layer structure has a core based on a combination of polypropylene terpolymer (with ethylene and butene) with Polybutene-1 copolymers (with ethylene) and with polypropylene elastomeric copolymers (with ethylene). A representative example of the Example 8 five layer film is as follows.

| Corona Treatment (optional) | |
| --- | --- |
| ~2.0-4.0 μm skin layer | 100% SKC Skygreen S 2008 PETG |
| ~2.0-5.0 μm interlayer | 50-67% Arkema Lotryl 24MA07T |
| | 33-50% LYB Adsyl 6C30F Terpolymer |
| 35-40 μm core layer | 40% LYB Adsyl 6C30F Terpolymer |
| | 26.7% LYB Koattro DP8310M Polybutene-1 copolymer |
| | 33% Vistamaxx 3980FL |
| ~2.0-5.0 μm interlayer | 50-67% Arkema Lotryl 24MA07T |
| | 33-50% LYB Adsyl 6C30F Terpolymer |
| ~2.0-4.0 μm skin layer | 100% SKC Skygreen S 2008 PETG |

Corona Treatment (Optional)

TABLE 14

| Film Property | Unit of Measure | TDS COC Skin- Comparative | TDS PETG Skin - Film of example 1 | TDS PETG Skin - Film example 2 |
| --- | --- | --- | --- | --- |
| Skin Composition | | 60% Topas 9506F-500 COC/ 40% Topas 8007F-600 COC | 100% SKC Skygreen S 2008 PETG | |
| Core Composition | | 40% Adsyl 6C30F/26.7% Koattro DP8310M/33.3% Vistamaxx 3980FL | | |
| Interlayer Composition | | None | 67% Orevac 18211/ 33% Adsyl 6C30F | 67% Orevac T 9304/ 33% Adsyl 6C30F |
| Shrink Tension TD | | | | |
| 80° C. | grams | not tested | 360 | 284 |
| 85° C. | grams | 529 | 428 | 357 |
| 90° C. | grams | not tested | 455 | 347 |
| 95° C. | grams | 529 | 475 | 383 |

The five layer PETG skin TD shrink films of this invention also exhibit a "softer" or less severe ramp up of shrink vs temperature relative to three layer COC floatable shrink film. This is a desirable feature for certain bottle geometries Properties of the film produced are described in the following Table 15. Optical properties (haze and gloss) are excellent, and the z axis strength exceeded the maximum for the test procedure (no delamination).

TABLE 15

| Film Property | Unit of Measure | Example 9 |
| --- | --- | --- |
| Skin Composition | | 100% Skygreen S 2008 PETG |
| Core Composition | | 40% Adsyl 6C30F/26.7% Koattro DP8310M/33.3% Vistamaxx 3980FL |
| Interlayer Composition | | 67% Lotryl 24MA07T/ 33% Adsyl 6C30F |
| TDO Temperatures | ° C. | Preheat/stretch/anneal: 101/101/96 |
| MDO Temperature | ° C. | 85 |

TABLE 15-continued

| Film Property | Unit of Measure | Example 9 | | | |
|---|---|---|---|---|---|
| Yield | in²/lb | 15,673 | 15,521 | 13,883 | 13,822 |
| Density | g/cm³ | 0.943 | 0.927 | 0.939 | 0.933 |
| Film Thickness (calculated) | microns | 48 | 49 | 54 | 54 |
| Skin Thickness (measured) | microns | 2.9 | 3.8 | 3.9 | 2.3 |
| Interlayer Thickness (measured) | microns | 2.3 | 2.5 | 4.3 | 4.9 |
| Haze | % | 2.7 | 2.6 | 2.7 | 2.6 |
| 45° Gloss - IN | gu | 97 | 99 | 94 | >100 |
| 45° Gloss - OUT | gu | 98 | 99 | 94 | 99 |
| Z axis Strength | g/in | | No Delamination | | |
| Gurley Stiffness MD | | 4.6 | 4.1 | 6.1 | 4.4 |
| Flex Stiffness MD/TD | g/in | 1.6/3.4 | 1.6/3.7 | 2.1/4.6 | 2.1/48 |
| Pin Puncture | grams | 2,011 | 1,946 | 1,971 | 2,015 |

In addition, as shown in Table 16 below, the floatable Example 9 film of this invention had very desirable shrink and shrink tension properties.

TABLE 16

| Film Property | Unit of Measure | Example 9 | | | |
|---|---|---|---|---|---|
| Skin Composition | | 100% Skygreen S 2008 PETG | | | |
| Core Composition | | 40% Adsyl 6C30F/26.7% Koattro DP8310M/33.3% Vistamaxx 3980FL | | | |
| Interlayer Composition | | 67% Lotryl 24MA07T/ 33% Adsyl 6C30F | | | |
| TDO Temperatures | ° C. | Preheat/stretch/anneal: 101/101/96 | | | |
| MDO Temperature | ° C. | 85 | | | |
| TD Shrink | | | | | |
| 65° C | % | −1 | 0 | −1 | 0 |
| 70° C | % | 6 | 10 | 7 | 7 |
| 75° C | % | 15 | 17 | 17 | 16 |
| 80° C | % | 26 | 25 | 26 | 26 |
| 85° C | % | 38 | 38 | 37 | 36 |
| 90° C | % | 47 | 47 | 48 | 47 |
| 95° C | % | 58 | 57 | 59 | 58 |
| 100° C | % | 65 | 65 | 64 | 65 |
| 105° C. | % | 70 | 70 | 70 | 69 |
| Shrink Tension TD | | | | | |
| 80° C | grams | 323 | 238 | 367 | 384 |
| 85° C | grams | 331 | 347 | 344 | 378 |
| 90° C | grams | 368 | 359 | 417 | 428 |
| 95° C | grams | 380 | 380 | 381 | 368 |
| 100° C | grams | 347 | 367 | 379 | 416 |

Five-Layer Structures and Examples of Invention

Additional floatable PETG five layer structures and examples are described below. The skin layers, with equivalent thicknesses within the range of 3 to 6 microns, comprises at least one amorphous copolyester having a Tg no greater than 85° C., more preferably in the range of 60° C.-85° C. and most preferably in the range of 60° C.-80° C. Preferably the at least one amorphous copolyester is a modified, amorphous polyethylene terephthalate; most preferably a glycol-modified polyethylene terephthalate (PETG). The interlayers between the PETG skin and polyolefin core has equivalent thicknesses within the range of 1 to 4 microns and comprises a blend of polypropylene terpolymer and an ethylene copolymer with a co-monomer of vinyl acetate, methyl acrylate or possibly ethyl acrylate. Optionally, the ethylene copolymer with vinyl acetate, methyl acrylate or possibly ethyl acrylate contains reactive functional groups. The blend ratio of the polypropylene terpolymer and the ethylene copolymer is selected to produce an acetate or acrylate concentration in the interlayer of ≥12 wt. % but ≤19.6 wt. %. The five layer structure has a core based on a combination of polypropylene terpolymer (with ethylene and butene) or high ethylene copolymer, a polybutene-1 copolymer (with ethylene), a polypropylene elastomeric copolymer (with ethylene), a polypropylene miscible hard resin, and optionally a styrene-ethylene-co-butene or styrene-ethylene-co-propylene diblock, or a styrene-ethylene-co-butene-styrene or styrene-ethylene-co-propylene-styrene triblock, or styrene-ethylene-co-propylene-styrene-ethylene-co-propylene tetrablock or mixtures of more than one.

| Corona Treatment (optional) | | |
|---|---|---|
| ~2.5-5.5 μm skin layer | 100% | 100% SKC Skygreen S 2008 PETG or Weezen HS200 PETG or Weezen HS310 PETG |
| ~1.0-4.0 μm interlayer | 50-70% | Arkema Orevac 18211 or Orevac T 9304 or Lotryl 24ma07T |
| | 30-50% | LYB Adsyl 6C30F Terpolymer |
| ~30-45 μm core layer | 30-40% | LYB Adsyl 6C30F Terpolymer or Adsyl 7415XCP Copolymer |
| | 20-27% | LYB Koattro DP8310M Polybutene-1 copolymer |
| | 20-33% | Vistamaxx 3980FL or Versify 3000 |
| | 0-20% | SEB or SEBS or SEP or SEPS or S-EP-S-EP Di-block, Tri-block, or Tetra-block Copolymer |
| | 1-16% | Plastolyn R1140 or equivalent Hard Resin |
| ~1.0-4.0 μm interlayer | 50-70% | Arkema Orevac 18211 or Orevac T 9304 or Lotryl 24ma07T |
| | 30-50% | LYB Adsyl 6C30F Terpolymer |
| ~2.5-5.5 μm skin layer 1 | 100% | 100% SKC Skygreen S 2008 PETG or Weezen HS200 PETG or Weezen HS310 PETG |

Corona Treatment (Optional)

The introduction of the polypropylene miscible hard resin into the film core will improve the stiffness of the core leading to an improvement in the Flexural and Gurley stiffness of the film relative to the previously described film which did not contain the hard resin. In addition, the thermal stability of the film under typical storage conditions of between 30° C. and 45° C., as determined by natural shrink in 24 hours, is substantially improved. Hard Resin material suitable for incorporation into the polyolefin core are commercially available from Eastman Chemical Company, Kingsport, Tenn. and include:

Plastolyn R1140, aliphatic, hydrogenated hydrocarbon resin with a Tg=91° C. and a MW=1,500 g/mol Regalite R1125, aliphatic, hydrogenated hydrocarbon resin with a Tg=70° C. and a MW=1,200 g/mol Regalrez 1126, aliphatic, hydrogenated hydrocarbon resin with a Tg=67° C. and a MW=1,250 g/mol Regalrez 6108, mixed aliphatic/aromatic, hydrocarbon resin with a Tg=55° C. and a MW=1,400 g/mol Hard Resin material suitable for incorporation into the polyolefin core also are commercially available from ExxonMobil, Houston, Tex. and include:

Escorez 5340, cycloaliphatic hydrocarbon resin with a Tg=86° C. and a MW=730 g/mol Escorez 5637, cycloaliphatic hydrocarbon resin with a Tg=80° C. and a MW=820 g/mol The core layer of this five layer film may also include one or more elastomeric styrene block copolymers, replacing, in part, one or more of the polypropylene terpolymer (with ethylene and butene) or high ethylene copolymer, polybutene-1 copolymer (with ethylene), and polypropylene elastomeric copolymer (with ethylene) components. The introduction of a styrene block copolymer into the core will provide a very attractive balance of optical properties, shrink performance in the range 80-95° C., puncture resistance, and film stiffness.

Styrene block copolymers (SBC) suitable for incorporation into the polyolefin core as an optional component include triblock styrene-ethylene-co-butene-styrene or styrene-ethylene-co-propylene-styrene or diblock styrene-ethylene-co-butene or styrene-ethylene-co-propylene or styrene-ethylene-co-propylene-styrene-ethylene-co-propylene tetrablock structures, commercially available from Kraton Corporation, Houston, Tex. or its distributor Univar Solutions, Downers Grove, Ill.

Suitable elastomeric styrene block copolymers include:

Kraton G1645: Styrene-ethylene-co-butene-Styrene triblock elastomer with 12.5% styrene content, melt flow rate=3.3 dg/min (230° C., 2.16 kg), and ethylene-co-butene block Tg=−42.

Kraton G1652: Styrene-ethylene-co-butene-Styrene triblock elastomer with 30% styrene content, melt index=5 dg/min (230° C., 5 kg), and a specific gravity of 0.91 g/cm$^3$.

Kraton G1643: Styrene-ethylene-co-butene-Styrene triblock elastomer with 20% styrene content, melt index=19 dg/min (230° C., 2.16 kg), and a specific gravity of 0.90.

Kraton G1657: Styrene-ethylene-co-butene-Styrene triblock(70%)/Styrene-ethylene-co-butene diblock (30%) with 13% styrene content, melt index=22 (230° C., 5 kg), and a specific gravity of 0.90 g/cm$^3$.

Kraton G1726: Styrene-ethylene-co-butene-Styrene triblock(30%)/Styrene-ethylene-co-butene diblock (70%) with 30% styrene content, melt flow rate=19 (190° C., 2.16 kg), and a specific gravity of 0.91 g/cm$^3$.

Kraton G1730: Styrene-ethylene-co-propylene-styrene-ethylene-co-propylene tetrablock elastomer with 21% styrene content, melt index=13 dg/min (230° C., 5 kg), and a specific gravity of 0.90 g/cm$^3$.

Kraton G1701: Styrene-ethylene-co-propylene diblock elastomer with 37% styrene content, melt index=1 dg/min (230° C., 5 kg), and a specific gravity of 0.92 g/cm$^3$.

Kraton G1702: Styrene-ethylene-co-propylene diblock elastomer with 28% styrene content, melt index<1 dg/min (230° C., 5 kg), and a specific gravity of 0.91 g/cm$^3$.

Elastomeric Styrene block copolymers (SBC) are also available from Kuraray Elastomer Division of Kuraray Americas, Inc., Houston, Tex. under the tradename SEPTON. Suitable SEPTON elastomer grades would include: SEPTON 2063: Styrene-ethylene-co-propylene-Styrene triblock elastomer with 13% styrene content, melt flow rate=7 dg/min (230° C., 2.16 kg).

SEPTON 20004F: Styrene-ethylene-co-propylene-Styrene triblock elastomer with 18% styrene content, melt flow rate=5 dg/min (230° C., 2.16 kg).

SEPTON 2002: Styrene-ethylene-co-propylene-Styrene triblock elastomer with 30% styrene content, melt flow rate=70 dg/min (230° C., 2.16 kg).

Elastomeric Styrene block copolymers (SBC) are also available from Asahi Kasei, Tokyo, Japan or its distributor Marubeni Specialty Chemicals, Inc., White Plains, N.Y. under the tradename Tuftec. A suitable Tuftec elastomer grade would include:

Tuftec P1500 SEBS with a specific gravity=0.91 g/cm$^3$, a PS content=30%, and a MFR=4.0 dg/min (230° C., 2.16 kg).

Although the present invention has been described in connection with preferred embodiments thereof, it will be appreciated by those skilled in the art that additions, modifications, substitutions, and deletions not specifically escribed may be made without departing from the spirit and scope of the invention defined in the appended claims.

What is claimed as the invention is:

1. A multilayer, oriented shrink film having a predominant direction of orientation either in the machine direction or transverse direction of film formation, the multilayer, oriented shrink film comprising a core layer, skin layers on opposed sides of the core layer, and an interlayer between each skin layer and the core layer for bonding each skin layer to the core layer, wherein said core layer comprises:

at least one polybutene-1 copolymer;

at least one polypropylene elastomeric copolymer including ethylene;

at least one or more polypropylene co- or terpolymers selected from the group consisting of polypropylene terpolymers with ethylene and butene-1, propylene ethylene copolymers, propylene butene-1 copolymers, and combinations thereof;

optionally, at least one polymer selected from the group consisting of styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers and styrene-ethylene-co-propylene diblock copolymers and combinations thereof; and optionally, at least one aliphatic, hydrogenated hydrocarbon resin, wherein: (a) said skin layers comprise at least one amorphous copolyester having a Tg no greater than 85° C., (b) said interlayers include at least one copolymer of ethylene with at least one polar comonomer, (c) said shrink film has a density less than 1 g/cm$^3$, (d) said shrink film has shrinkage of greater than 50% at 95° C. in the predominant direction of orientation, (e) said shrink film has a haze less than 6% and a clarity greater than 60%, (f) said shrink film has an interlaminar strength between the skin layers and interlayers and between the interlayers and core layer greater than 150 g/in and (g) optionally wherein said multilayer, oriented shrink film is corona treated on at least one surface.

2. The multilayer, oriented shrink film of claim 1, wherein said propylene ethylene copolymers include propylene high ethylene copolymers having an ethylene content in the range of 4.0%-7% by weight of the copolymer and wherein said propylene butene-1 copolymers include propylene, high butene-1 copolymers having a butene-1 content in the range of about 7 to about 22% by weight of the copolymer.

3. The multilayer, oriented shrink film of claim 1, wherein said core layer comprises at least one polybutene-1 copolymer, at least one polypropylene elastomeric copolymer including ethylene and a polypropylene terpolymer, said terpolymer being the primary component, by weight, in the core layer.

4. The multilayer, oriented shrink film of claim 1, wherein the core layer has a thickness greater than the combined thickness of the opposed skin layers and the two interlayers.

5. The multilayer oriented shrink film of claim 1, wherein said core layer comprises:
   about 30% to about 40% polypropylene co- or terpolymer selected from the group consisting of polypropylene terpolymers with ethylene and butene-1, propylene ethylene copolymers, propylene butene-1 copolymers and combinations thereof;
   about 20% to about 27% polybutene-1 copolymer;
   about 20% to about 33% polypropylene elastomeric copolymer;
   optionally, about 0% to about 20% polymer selected from the group consisting styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers and styrene-ethylene-co-propylene diblock copolymers and combinations thereof; and
   optionally, about 1% to about 16% aliphatic, hydrogenated hydrocarbon resin.

6. The multilayer oriented shrink film of claim 1, wherein said core layer comprises about 0% to about 20% polymer selected from the group consisting styrene-ethylene-co-propylene-styrene-ethylene-co-propylene tetrablock, styrene-ethylene-co-butene-styrene triblock copolymers, styrene-ethylene-co-propylene-styrene triblock copolymers, styrene-ethylene-co-butene diblock copolymers and styrene-ethylene-co-propylene diblock copolymers and combinations thereof.

7. The multilayer oriented shrink film of claim 1, wherein said core layer comprises about 1% to about 16% aliphatic, hydrogenated hydrocarbon resin.

8. The multilayer, oriented shrink film of claim 1, wherein said amorphous copolyester in said skin layers is a modified polyethylene terephthalate.

9. The multilayer, oriented shrink film of claim 1, wherein said amorphous copolyester in said skin layers is a glycol modified polyethylene terephthalate.

10. The multilayer, oriented shrink film of claim 1, wherein said skin layers are of substantially the same thickness and said interlayers are substantially of the same thickness.

11. The multilayer, oriented shrink film of claim 1, wherein said skin layer includes 100% amorphous glycol-modified polyethylene terephthalate.

12. The multilayer, oriented shrink film of claim 1, wherein said skin layers include at least one amorphous copolyester in the form of a glycol-modified polyethylene terephthalate and both of the interlayers include a polypropylene terpolymer and an ethylene copolymer with vinyl acetate or methyl acrylate or ethyl acrylate.

13. The multilayer, oriented shrink film of claim 1, wherein the ethylene copolymer with vinyl acetate or methyl acrylate or ethyl acrylate in the interlayers includes reactive functional groups.

14. The multilayer, oriented shrink film of claim 1, wherein said interlayers include a combination of ethylene-vinyl acetate terpolymer and polypropylene terpolymer in a ratio for providing interlayer adhesion to said skin layer and core layer in excess of 350 g/in.

15. The multilayer oriented shrink film of claim 1, wherein the polar comonomer is selected from the group consisting of MAH, methyl and butyl acrylate and methacrylate, vinyl acetate and vinyl alcohol combined with a polypropylene terpolymer or copolymer.

16. The multilayer oriented shrink film of claim 1, wherein said interlayers comprise:
   about 50 to about 70% ethylene copolymer with vinyl acetate or methyl acrylate or ethyl acrylate in the interlayer includes reactive functional groups; and
   about 30% to about 50% at least one polypropylene co- or terpolymer selected from the group consisting of polypropylene terpolymers with ethylene and butene-1, propylene ethylene copolymers, propylene butene-1 copolymers and combinations thereof.

17. The multilayer oriented shrink film of claim 1, wherein the polar comonomer content is less than 20%.

18. The multilayer, oriented shrink film of claim 1, wherein the density is below 0.98 $g/cm^3$.

19. The multilayer, oriented shrink film of claim 1, wherein said shrink film is uniaxially oriented in the transverse direction of film formation or in the machine direction of film formation.

20. The multilayer, oriented shrink film of claim 1, wherein said film has a haze less than 2%.

21. The multilayer, oriented shrink film of claim 1, wherein said film has a 24 hour natural shrink no greater than 1% in the direction of maximum orientation in the temperature range of 35-45° C.

* * * * *